Patented June 2, 1931

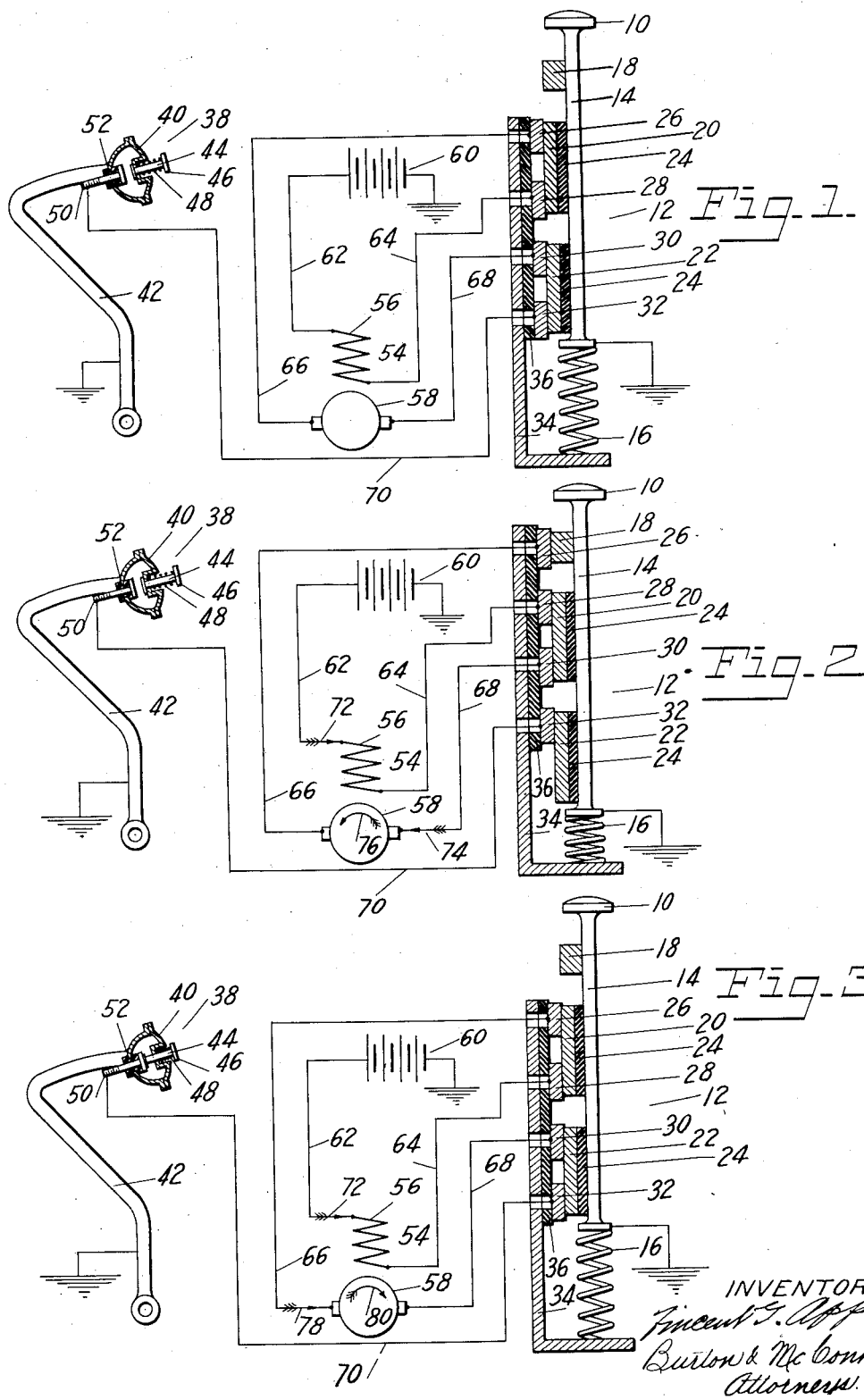

1,808,095

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

CONTROL MECHANISM FOR MOTOR VEHICLE ELECTRIC STARTING AND BRAKING MOTORS

Application filed January 30, 1929. Serial No. 336,299.

This invention is shown, though not claimed, in my co-pending application Ser. No. 336,298, filed January 30, 1929, (File No. 5,339) which relates to control mechanism for a motor vehicle electric starting and braking motor whereby it may be employed for starting or for braking. The motor here shown is of the reversible type and may be utilized when rotated in one direction for starting the engine of a vehicle and in the other direction for applying its brakes.

The object of the invention is to provide control means of simple construction for this two purpose motor, which is operable by the same effort and by the same movements as are ordinarily employed in the operation of motor vehicle starting and braking mechanism.

The motor is adaptable to the purpose and is located in a circuit controlled by two switches. One switch may be designated as the starting switch and is operable to make and break the circuit through the motor in one direction. The second switch is operable to make and break the circuit through the motor in the opposite direction. The second switch, however, is controlled in part by the starting switch and is only operable to make the circuit through the motor when the starting switch is in a given position as, for example, in its normally open position.

I attain this object by the controls and connections hereinafter described and shown in the accompanying drawings, wherein—

Fig. 1 is a schematic illustration of the controls and connections in the inoperative position.

Fig. 2 is a similar illustration but with the controls in position to operate the motor in one direction, as for starting the engine.

Fig. 3 shows the controls set to run the motor oppositely, as for applying brakes.

Similar numerals refer to similar parts throughout the several views.

For purposes of illustration, tread 10 of which 12 corresponds to the tread of a starting switch and is preferably similarly placed. The stem 14 is adapted to be downwardly depressed by the application of foot pressure to tread 10 and to be returned by the upward pressure of spring 16. A short contact member 18 is secured to and in electrical contact with stem 14.

Two longer contact members 20 and 22 are secured to but electrically insulated from the stem by pads 24 of insulating material. Contacts 26, 28, 30 and 32 are secured to the switch frame 34 and are insulated from each other and from the frame by insulating strip 36.

The switch 38 which is built into tread 40 of pedal 42 is required to act in conjunction with switch 12 only when the motor is to be rotated in a direction opposite to that resulting from depression of switch 12, and may be utilized to apply vehicle brakes in the manner disclosed in my above specified copending application. Switch 38 comprises a grounded stem 44 inwardly depressable by head 46 and returnable by spring 48, together with an insulated contact 50 supported in pedal 42 and insulated therefrom by insulating bushing 52.

The several figures of the drawings show the motor 54 diagrammatically, 56 being the field coil and 58 the armature. A battery 60 supplies the electric current. One terminal of the battery is grounded, while the other is connected by wire 62 to one end of the field coil 56. The other end of the field winding is connected by wire 64 to terminal 28. Wires 66 and 68 connect armature 58 to terminals 26 and 30 respectively. An additional wire 70 connects terminal 50 of pedal switch 38 to terminal 32 of starting switch 12. The stems 14 and 44 of the two switches are grounded.

Fig. 1 shows the stems 14 and 44 of the two switches in their inoperative normally idle position wherein no circuit is made and consequently no current will flow with the switches in this position.

Fig. 2 shows tread 10 of starting switch 12 depressed to the starting position. By tracing the circuit it may be seen that current may flow from battery 60 through field coil 56 in the direction of arrow 72 and through the armature 58 in the direction of the arrow 74.

The motor, as viewed from the commutator end, then runs in the direction of the arrow 76, which is the proper starting direction as determined by common practice. No current flows in wire 70, nor would current flow therein even if pedal switch 38 were at this time closed by accident or otherwise.

In Fig. 3 the starting switch 12 is returned to its normal inoperative position and stem 44 of pedal switch 38 is depressed so that insulated terminal 50 is connected to ground. In this position current passes from battery 60 through field coil 56 in the direction of arrow 72 just as in Fig. 1, but through the armature in the direction of the arrow 78 which is opposite to the direction taken through the armature in Fig. 2. The motor now revolves in the direction of arrow 80.

From the foregoing description it will be apparent that, by means of the two controls and their connections herein shown, the starting motor may be revolved in one direction and then in the other direction, with precisely the same movements on the part of the operator as is required in the common practice of starting the engine of an automotive vehicle and applying the vehicle brakes, and that no ill effects occur if both controls are simultaneously operated by accident or otherwise.

What I claim is:

1. Mechanism of the character described comprising, in combination, a reversible electric motor, a switch for said motor operable to one position to complete at any time all connections for running the motor in one direction, and operable to another position to only partially complete the connections for operating the motor in the reverse direction, and a second switch separately operable to complete the said connections to operate the motor in said reverse direction.

2. Mechanism of the character described comprising, in combination, a reversible electric motor, a depressible pedal, a reversing switch operable by foot pressure against a spring to complete all connections for rotating the motor in the one direction, and returnable by said spring to the normal position whereby all but one connection is made to rotate the motor in the reverse direction, and a second switch built into the pedal operable by foot pressure to said pedal to complete the one said open connection.

3. Mechanism of the class described comprising, in combination, an electric circuit including a motor, a manual operating member, a manually operable switch in said circuit having a normal position at which the circuit is open but operable to make the circuit through the motor to cause the motor to run in one direction, a second switch associated with said manual operating member and operable upon movement thereof to make the circuit through the motor and in part through the first mentioned switch only when said switch is in the normally open position to cause the motor to run in the opposite direction.

4. Electric control mechanism comprising, in combination, an electric circuit including a motor, a switch in said circuit having a normal position in which the circuit is open and a second position to which it may be moved at which it is always operable to close the circuit through the motor to cause rotation in one direction, a second switch in said circuit having a normal position at which the circuit is open and a second position at which the circuit is closed only when the first mentioned switch is in a determined position.

5. Electric control mechanism comprising, in combination, an electric circuit including a motor, a switch in said circuit having a normal position at which the circuit is open and a second position to which it may be moved at which it is always operable to close the circuit through the motor, a second switch in said circuit having a normal position at which the circuit is open and a second position at which the circuit is closed only when the first mentioned switch is in the normally open position.

6. Electric control mechanism for a reversible motor comprising, in combination, an electric circuit including a motor, a switch in said circuit having a normal position at which the circuit is open, a second switch in said circuit having a normal position at which the circuit is open, said first switch being operable at any time to close the circuit through the motor for rotation in one direction irrespective of the position of the second switch, said second switch being operable to a position at which the circuit is closed through the motor in the opposite direction but only when the first switch is in open position.

7. Electric control mechanism for a motor comprising, in combination, an electric circuit including a motor, a switch in said circuit, a second switch in said circuit, said first switch being operable to make and break the circuit through the motor irrespective of the position of the second switch, said second switch normally positioned to break the circuit but operable to make the circuit through the motor when the first switch is in a given position.

8. Control mechanism for a power device comprising a source of power having a reversible power device coupled therewith to receive power therefrom to be driven in reverse directions, control means normally positioned to disconnect the reversible power device from the source of power operable at any time to couple the same therewith to be driven thereby in a given direction, and auxiliary control means normally positioned to disconnect the reversible power device from the source of power operable only when the first control means is positioned to disconnect the same therefrom to couple the power device with the source of power to be driven thereby in another direction.

9. Control mechanism for a power device comprising a source of power having a reversible power device coupled therewith to receive power therefrom to be driven in reverse directions, a control member normally disconnecting the reversible power device from the source of power operable at any time to couple the same therewith to be driven thereby in one direction, a second control member normally disconnecting said reversible power device from the source of power operable to connect the same therewith to be driven thereby in the opposite direction only when the first control device is disconnecting the same therefrom.

10. Mechanism of the character described comprising, in combination, a reversible electric motor, a switch for said motor operable against a resilient resistance means to a position to complete a circuit through the motor in one direction, and returnable by said resilient resistance means to normal position to complete a portion of the circuit therethrough in a reverse direction, and a separate switch for completing the said last mentioned circuit.

11. Mechanism of the character described comprising, in combination, an electric circuit including a reversible electric motor, a depressible pedal, a switch in said circuit having a normally elevated open position and depressible at any time to close the circuit through the motor in one direction, and a pedal actuated switch in said circuit operable only when said first mentioned switch is in its elevated position to close the circuit through the motor in the opposite direction.

12. Mechanism of the character described comprising, in combination, an electric circuit including a reversible motor, a manual operating member, a switch in said circuit having a normally open position and operable at any time to make the circuit through the motor in one direction, a second switch in said circuit associated with the manual operating member operable only when the first switch is in open position to make the circuit through the motor in the opposite direction.

13. A reversible electric motor control comprising a depressible pedal yieldably held in elevated position and including four contacts, leads secured to each of said contacts, said leads extending to opposed armature brushes of said reversible electric motor, and one each to the motor field coil and a secondary switch, means for closing said secondary switch, said pedal contacts being adapted to close a circuit through the field coil and armature in one direction when elevated and in the other when depressed, said elevated position including in the circuit the secondary switch.

In testimony whereof, I, VINCENT G. APPLE, sign this specification.

VINCENT G. APPLE.